（12） United States Patent
Persi et al.

(10) Patent No.: US 7,180,072 B2
(45) Date of Patent: Feb. 20, 2007

(54) METHOD AND APPARATUS FOR CREATING A REGISTRATION NETWORK OF A SCENE

(75) Inventors: Fred M. Persi, Aliquippa, PA (US); Eric Hoffman, Liberty, PA (US)

(73) Assignee: Quantapoint, Inc., Pittsburgh, PA (US)

( * ) Notice: Subject to any disclaimer, the term of this patent is extended or adjusted under 35 U.S.C. 154(b) by 0 days.

(21) Appl. No.: 11/065,745

(22) Filed: Feb. 25, 2005

(65) Prior Publication Data

US 2005/0190384 A1 Sep. 1, 2005

Related U.S. Application Data

(60) Provisional application No. 60/549,413, filed on Mar. 1, 2004.

(51) Int. Cl.
*H01J 3/14* (2006.01)
(52) U.S. Cl. .................................. 250/370.08; 250/349
(58) Field of Classification Search ........... 250/370.08, 250/206.1, 342, 334, 234; 382/154; 356/601; 359/202
See application file for complete search history.

(56) References Cited

U.S. PATENT DOCUMENTS

| | | | | |
|---|---|---|---|---|
| 5,531,520 A | * | 7/1996 | Grimson et al. | 382/131 |
| 5,638,164 A | * | 6/1997 | Landau | 356/5.01 |
| 6,181,425 B1 | * | 1/2001 | Svetkoff et al. | 356/603 |
| 6,201,248 B1 | * | 3/2001 | Marion et al. | 250/370.08 |
| 6,330,523 B1 | * | 12/2001 | Kacyra et al. | 702/159 |
| 6,420,698 B1 | * | 7/2002 | Dimsdale | 250/234 |
| 6,542,249 B1 | * | 4/2003 | Kofman et al. | 356/601 |
| 6,600,168 B1 | * | 7/2003 | Geng | 250/559.22 |
| 6,750,974 B2 | * | 6/2004 | Svetkoff et al. | 356/602 |

OTHER PUBLICATIONS

Devrim Akca, "Full Automatic Registration of Laser Scanner Point Clouds," (Sep. 2002).
Berger, Jeffrey W., Leventon, Michael E., Hata, Nobuhiko, Wells, William, Kikinis, Ron, "Design Considerations for a Computer-Vision-Enabled Ophthalmic Augmented Reality Environment," CVRMED/MRCAD (Grenoble, France), (1997).
Dijkman, S.T., Van Den Heuvel, F.A., "Semi Automatic Registration of Laser Scanner Data," IAPRS, XXXIV (5), p. 12-17, (2002).

* cited by examiner

*Primary Examiner*—Otilia Gabor
*Assistant Examiner*—Faye Boosalis
(74) *Attorney, Agent, or Firm*—Ansel M. Schwartz

(57) ABSTRACT

An apparatus for creating a registration network of a scene includes a laser scanner for scanning the scene and obtaining data of the scene. The apparatus includes a plurality of targets placed in the scene. The apparatus includes a mechanism for forming a registration network using only the laser scanner data. A method for creating a registration network of the scene.

25 Claims, 6 Drawing Sheets

METHOD AND APPARATUS FOR CREATING A REGISTRATION NETWORK OF A SCENE

This application claims the benefit of U.S. Provisional Application No.: Application No. 60/549,413 filing date Mar. 1, 2004.

FIELD OF THE INVENTION

The present invention is related to registering multiple laser scan measurements of a scene to a reference coordinate system. More specifically, the present invention is related to registering multiple laser scan measurements of a scene to a reference coordinate system which forms the registration network and a survey of the scene from data only from the scanner.

BACKGROUND OF THE INVENTION

A laser scan consists of a large number of range and intensity measurements made from a single location in space. By steering the laser beam through horizontal and vertical angles, distances are measured to objects visible within the line-of-sight. Each point is measured in the coordinate frame of the scanner itself. Because of occlusion and the finite performance range of the scanner, it is necessary to scan from multiple vantage points throughout the scene in order to provide complete and accurate coverage. For each scan taken, a new coordinate frame is established unique to location and orientation of the scanner during operation.

When using more than one scan, it becomes necessary to determine the geometric information connecting these coordinate frames together. With this information, it becomes possible to relate measurements made among scans to others or to the world coordinate system. This process of connecting coordinate frames together is called registration. In fact, registration is often necessary even if only one scan is taken because the subsequent processing of the data requires it to be referenced back to a world coordinate system established in the scene itself.

One common approach has been to structure the scene with targets, which are then surveyed into the world coordinate system. Each scan then can be registered to the world system by identifying the targets visible and determining the rotation and translation parameters that best align scan with the network of targets. Essentially an independent survey network is created, into which the scans are registered one-by-one.

The advantages of the survey approach are that it produces results of high accuracy and also quantifies the uncertainty of these results. The disadvantages, however, is that measurements are error-prone and difficult to make, and overall the process is slow. Consequently, blunders are difficult to identify. Improvements are possible if more targets (and therefore) more measurements per setup station are used, but doing so further slows down the process.

SUMMARY OF THE INVENTION

The present invention pertains to an apparatus for creating a registration network of a scene. The apparatus comprises a laser scanner for scanning the scene and obtaining data of the scene. The apparatus comprises a plurality of targets placed in the scene. The apparatus comprises means for forming a registration network using only the laser scanner data.

The present invention pertains to a method for creating a registration network of the scene. The method comprises the steps of placing a plurality of targets in the scene. There is the step of scanning the scene to obtain data of the scene with a laser scanner. There is the step of identifying the targets in the scene. There is the step of forming the registration network using the laser scanner data only.

The present invention pertains to an apparatus for creating a registration network of a scene. The apparatus comprises a laser scanner for scanning the scene and obtaining data of the scene. The apparatus comprises a plurality of targets placed in the scene. The apparatus comprises means for automatically identifying the targets in the scene in real time.

The present invention pertains to a method for creating a registration network of a scene. The method comprises the steps of scanning the scene to obtain data of the scene with a laser scanner. There is the step of forming the registration network and a survey of the scene from the data only from the scanner.

An apparatus and method for creating registration networks of a scene from data acquired through multiple laser scans. Models consist of 3D volume elements correctly located with respect to a given world coordinate system. Each volume element represents a single measurement by the scanning system of a particular area in the scene: for each ray generated by the scanner, the 3D location of the illuminated region is recorded, along with any additional information acquired, such as reflectance or color. Knowledge of the world locations and of the volume elements may be used (i) to calculate attributes of the scene, such as distances between surfaces or objects, lengths or diameters of pipes, (ii) to construct computer models for both 2D or 3D visualization of the scene or specific regions within the scene, or (iii) to test the scanned model for conflicts with other computer other models, e.g. models that may be acquired either by laser scanning or from computer-aided-drafting (CAD) plans.

The scene is structured with fiducial targets. As part of overall data acquisition, the laser scanning system operates as a survey instrument and measures the location, orientation, and identity of the targets. These measurements are collected and processed both automatically and semi-automatically to solve for the geometry connecting the scans to the world coordinate system. The models are produced by assembling the data from the individual scan together to form a consistent geometric network from which quantitative information may be derived, either for visualization or in the form of measurements.

In prior work, the network is created by independent survey, and then the scans are connected to it. If used at all, the scanner data is used only to tie the scan into the already existing network. Our solution does not require the use of any additional survey or survey equipment; the laser scanning system acquires all necessary information alone. Doing so greatly simplifies the field process, which in turn yields greater throughput and higher quality results.

BRIEF DESCRIPTION OF THE DRAWINGS

In the accompanying drawings, the preferred embodiment of the invention and preferred methods of practicing the invention are illustrated in which.

DETAILED DESCRIPTION

Figure 11:
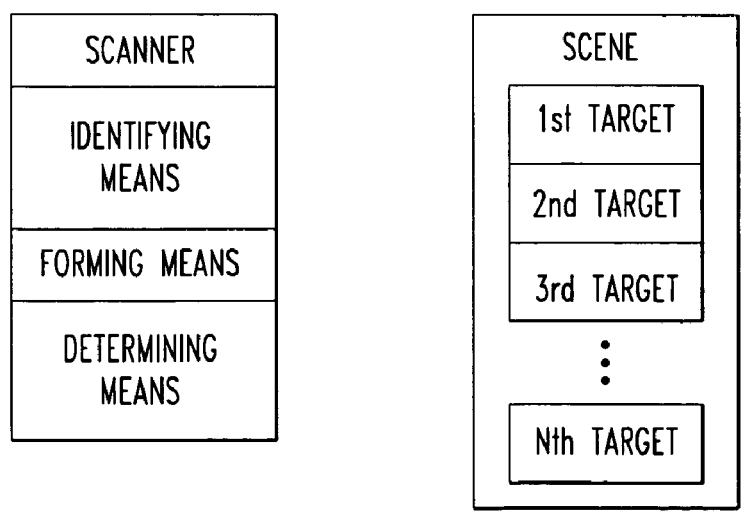
FIG. 11 is a block diagram of the apparatus of the present invention.

Referring now to the drawings wherein like reference numerals refer to similar or identical parts throughout the several views, and more specifically to FIG. 11 thereof, there is shown an apparatus for creating a registration network of a scene. The apparatus comprises a laser scanner for scanning the scene and obtaining data of the scene. The apparatus comprises a plurality of targets placed in the scene. The apparatus comprises means for forming a registration network using only the laser scanner data.

The forming means preferably automatically identifies the targets in the scene. Preferably, the identifying means extracts the targets from the data. The identifying means preferably identifies the targets from the data. Preferably, the identifying means extracts all targets at a same first time from the data.

The identifying means preferably identifies all targets at a same second time from the data. Preferably, the apparatus includes means for forming an image of the scene from the registration network. A coordinate location of a target is preferably computed using both range and reflectance data. Preferably, the targets are two dimensional. The apparatus preferably includes means for determining an attribute of an element in the scene.

The present invention pertains to a method for creating a registration network of the scene. The method comprises the steps of placing a plurality of targets in the scene. There is the step of scanning the scene to obtain data of the scene with a laser scanner. There is the step of identifying the targets in the scene. There is the step of forming the registration network using the laser scanner data only.

The identifying step preferably includes the step of automatically identifying the targets. Preferably, the identifying step includes the step of extracting the targets from the data with the computer. The identifying step preferably includes the step of identifying the targets from the data with the computer. Preferably, the extracting step includes the step of extracting all the targets at a same first time from the data with the computer.

The identifying step preferably includes the step of identifying all the targets at a same second time from the data with the computer. There is preferably the step of forming an image of the scene from the registration network. Preferably, there is the step of determining an attribute of an element in the scene.

The present invention pertains to an apparatus for creating a registration network of a scene. The apparatus comprises a laser scanner for scanning the scene and obtaining data of the scene. The apparatus comprises a plurality of targets placed in the scene. The apparatus comprises means for automatically identifying the targets in the scene in real time.

The present invention pertains to a method for creating a registration network of a scene. The method comprises the steps of scanning the scene to obtain data of the scene with a laser scanner. There is the step of forming the registration network and a survey of the scene from the data only from the scanner.

For instance, lengths, distances, volumes, or areas can all be computed. If a customer needs to know how long a pipe is, where it is located, or what the clearance is between two pipes, the registration network can provide the answer. If the customer simply needs to visualize the area, this can be accomplished by creating a computer-graphical 3D model and using manipulation tools to rotate, translate, or scale the object on-screen to comprehend visually the structure under scrutiny. Lastly, there is a need by customers to check their design models with the actual conditions. In this case, tools can be provided that will tell the operator where a conflict occurs. Both numerical and visual feedback are given so the operator can understand where the problem originates.

In the operation of the invention, the present invention integrates the survey work directly into the laser scanning process. No independent survey is required since the laser scanner itself is used as the precision measurement device. The survey information is collected as the scanning progresses. Automatic and semi-automatic algorithms build the network in real-time, as the scans are acquired.

The laser scanner removes or reduces the aforementioned disadvantages in the following ways:

The scanner operating software contains algorithms that enable quick and automatic measurements to all targets seen in the scan. The potential for overlooking a target is greatly reduced or eliminated.

These algorithms operate in real-time, so all targets can be processed: there is no longer a time penalty for identifying additional targets per scan. Automating the measurement process and the subsequent recording and processing of the measurements also eliminates operator error and improves the quality of the network.

Both range and reflectance data are used to identify links between scans and scene targets, yielding fewer false matches and quantifying the uncertainty of the measurements automatically.

For each target an orientation is computed and used for consistency checks and quality control. Such orientation is not used in traditional surveys because of the difficulty or impossibility of obtaining such information.

Novel visualization tools and graphical interfaces are provided to the operator. Network status and quality are immediately assessable at all times. Instant feedback is given whenever a problem is detected, allowing the operator to fix the issue when it arises.

The data-collection process has been standardized and is enforced by the operating software directly.

It is important to emphasize that the network assembly technique described here does not require any survey or measurement devices other than the laser scanner itself. By building in quality assurance directly into the method, it is possible to eliminate the need for additional survey information, such as might be obtained with a total station, theodolite, or transit. Doing so not only removes extra cost from the field process but also improves the reliability of results by eliminating ambiguities and conflicts that inevitably arise with multiple sources of data. Of course it is always possible to utilize additional survey information if circumstances warrant.

Applications

These techniques have application for customers in a wide variety of industries and applications, including Architectural: The documentation of houses, apartment buildings, schools, offices, and department stores. Floor plans, elevation drawings, site maps.

Commercial: Process plants, offshore oil rigs, chemical facilities, and airplane hangars.

Art: Statues, sculptures, etc.

Civil: Bridge, tunnel, or road mapping.

Definitions

Local Coordinate System, or LCS

Any scanner has an intrinsic frame of reference with respect to which all measurements are made. For present purposes it is immaterial how the frame is defined; it suffices to say that every scanned pixel taken within a single scan represents two quantities: a reflectance intensity I and a three-dimensional vector $_{LCS}P$ representing the location of the imaged element. The subscript "LCS" emphasizes that this vector has been measured in the local coordinate system of the scanner.

World Coordinate System, or WCS

For every scene one can define a world coordinate system (WCS.) Registration entails constructing the mathematical transformation between the local and world coordinate systems, and evaluating the accuracy of these transformations. Since these systems are all 3-dimensional, the transformation can be defined by six parameters: three rotational and three translational. Together, these parameters form the Euclidean transformation between the WCS and an LCS; there will be one such transformation for each scan.

Survey

In survey work, a device such as a theodolite, total station, or transit is setup at various locations in space, called stations. From each station the angles—and optionally the distances—to other, secondary, stations are measured precisely. These measurements are analyzed mathematically to determine the most likely configuration of the network's geometry, along with uncertainty measures for each station location or rotation. In many cases, checkerboard-style targets are used for the secondary stations. A crew places these targets at strategic locations in the scene where they are visible to the measurement device.

Scene Target

Figure 1:
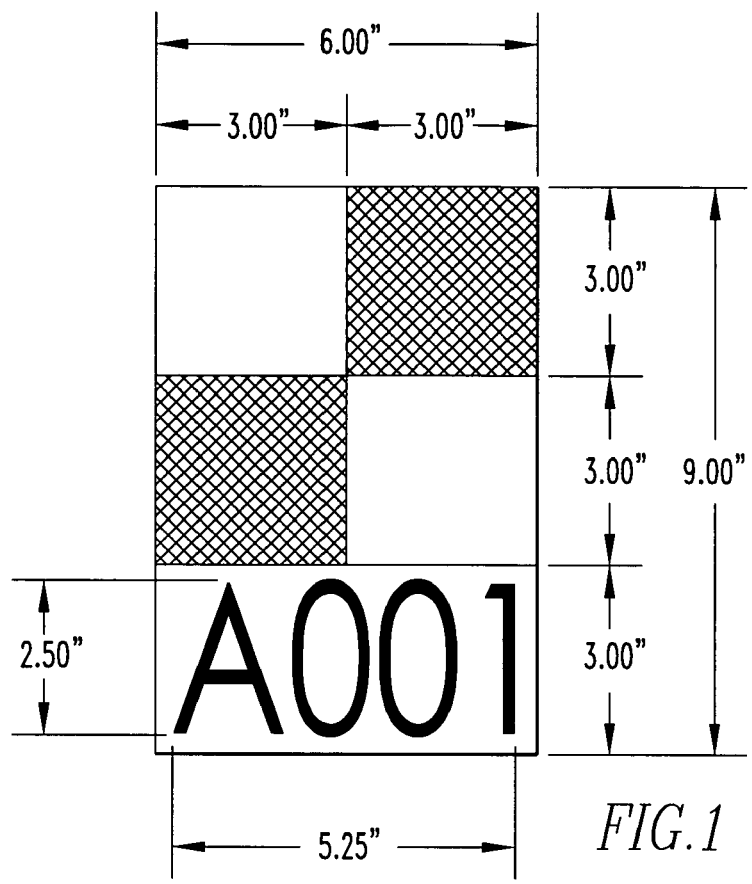
FIG. 1 is a sample layout for a scene target.

To make this technique as broadly applicable as possible it is necessary to have few assumptions about the nature of the scene in question. In particular, no information about the original layout or geometry should be used. Therefore, it is necessary to introduce fiducial markers, called scene targets, into the scene. The scene targets are printed onto paper and include a black-and-white pattern placed above a single identifying code as show in FIG. 1. To simplify identification, each scene target is given a unique name, currently restricted to four characters, but possible to extend at a later date. With each scene target the system records the following information:

1. The identity (unique name) of the scene target;
2. The location in the world coordinate system (WCS);
3. The direction the target is facing (i.e. surface normal) if appropriate;
4. A qualitative measure of the confidence of the location. The choices are: Preliminary, Estimated, and Absolute.

When a scene target is first identified in a scan image (as explained below) it is marked "Preliminary." When the scene target becomes identified in additional scans without geometric conflict, the confidence is raised to "Estimated." If the world coordinates of the scene target are known external to the operating software then the "Absolute" qualifier is used. This happens, for instance, if the world coordinates are taken from an auxiliary survey or benchmark location. In the latter case the location is considered fixed and will not be altered during the network-building phase.

The checkerboard pattern is chosen for its simplicity and ease-of-use, but other possibilities do exist. The only criteria are that a scene target be large enough to be seen at a distance by the scanner, and that its precise location can be determined accurately and quantifiably when imaged by a single scan.

Target Link, or Scan-Target Link

At least one scan, most likely two or three, will image every scene target. The measurement and intensity information acquired by a single scan of this scene target is referred to as the scan-target link. It is important to understand that the "scene target" is the physical object in the scene, whereas the "link" is the measured representation of the scene target made by the scanner. There are typically several links for each scene target, since the scene targets are visible in multiple scans. A complete link will contain the following information:

1. The identity of-the scene target imaged;
2. The identity of the scan in which the image occurred;
3. The 2D location (I, J) in the scan image of the center of the imaged scene target;
4. The range from the origin of the scan's LCS to the center of the imaged scene target;
5. The 3D coordinates (relative to the LCS) of the center of the scene target. This information can be calculated from the information (3), and (4), above. The details are given below in the section on "scan-target link" extraction and identification.
6. A quality measure of how accurate these 3D coordinates are. The system uses the standard deviation in the range measurement (4) above.

Optionally, a link may also specify:

7. An orientation, for example, a surface normal, perpendicular to the face of the scene target. This vector is computed relative to the LCS, and depends on the geometric relationship between the scan and the scene target. Thus it is a property of the link and not of the scene target. Having this information improves the robustness of the process, but is not required.

Note that the process described herein is not restricted to paper scene targets as described above. The principle is the same and applies generally for any type of fiducial marker, as long as it satisfies the following criteria:

1. It can be independently viewed from multiple vantage points;
2. It can be ascribed a unique 3D point-location in the WCS; and
3. A corresponding link can be computed for each scan that sees it.

Examples include objects of simple geometry, such as spheres, cubes, or tetrahedrons.

Station
    Any identified point in 3D space, typically either scans or scene targets. A station may or may not have a local coordinate system attached.
Network
    A collection of stations connected geometrically by measurements made among stations. The most common measurement is the 3D location of a scene target made in the LCS of a given scan.
Registration
    The act or result of determining the Euclidean transform connecting the world coordinate system to a local coordinate system for a given scan. Also, the process of connecting a station into a network.

Graphical User Interface (GUI)

Figure 2:
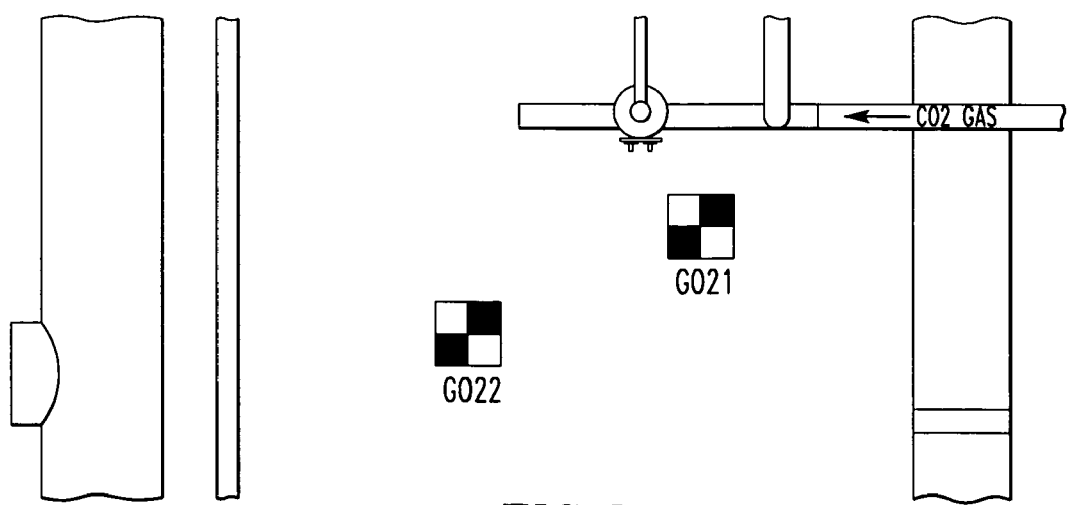
FIG. 2 is a reflectance image showing two targets for which links have not yet been extracted.
Figure 3:
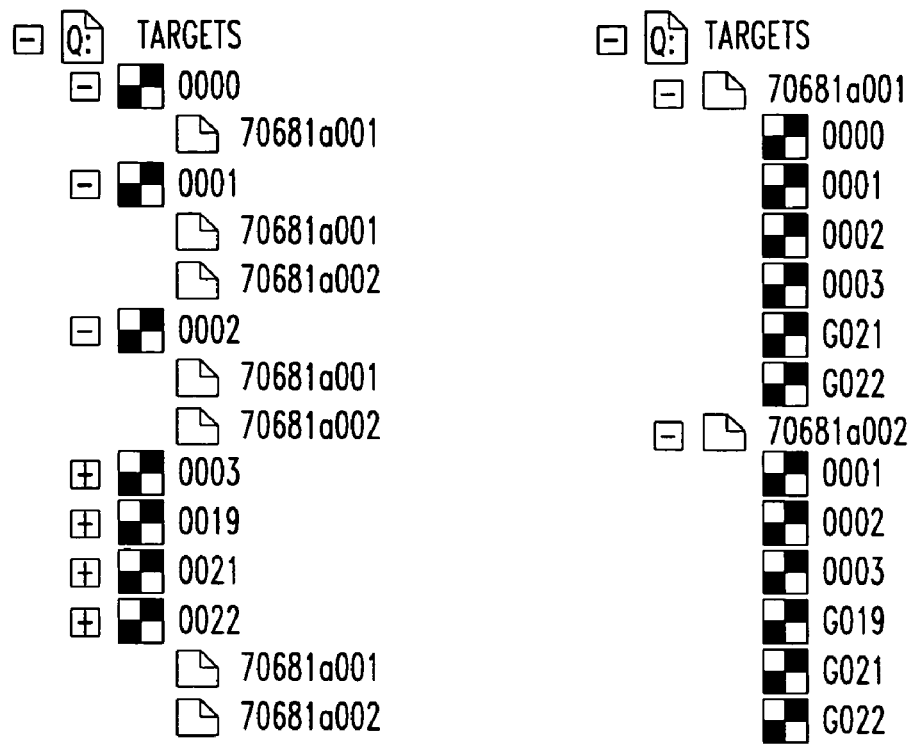
FIG. 3 is a topology view tree representation of scan-target relationships.

To facilitate the quick and easy creation of the registered network assembly, the operator is presented with a graphical user interface, which is integrated with the scanner control software for convenience and ease-of-use. The content of all view are updated dynamically whenever data changes, so the operator is always looking at the current state of the network assembly. At any moment, the following windows are available:

Image Views
    Immediately after acquisition, each scan is stored on the system hard disk and is retained in system memory. A window displaying the reflectance image is automatically made available to the user. A sample reflectance image is shown in FIG. 2. This image may be zoomed or panned on-screen. Overlay graphics are used to indicate the scan-target links by marking the area where the scene target is visualized and measured in the scan. Keep in mind that although the operator sees a reflectance image, attached to each pixel is a calibrated 3D Cartesian coordinate.
    All scan-target links are identified with a color symbol—a partial square containing a crosshair—on the image, located at the measured position in the image. The symbol is large enough to be seen if the image is zoomed out to its maximum extent, but when zoomed in, the crosshair gives the precise location of the link, to sub-pixel accuracy. The effect is that of two connected boxes, each one overtop of a white region of the target, though in reality it is simply a crosshair for sub-pixel identification within a larger object that can be seen when zoomed out. Three colors are used:
        Red indicates that the link has not been identified, i.e., the corresponding scene target has not been identified.
        Yellow indicates that the link has been named, but that the name is preliminary, and has not been verified in a different scan. That is, the first time a link to a scene target is made, the color is yellow.
        Green indicates that the link's identity has been independently verified by a different scan. Once a scene target has links to more than one scan (and the network geometry is validated), the color is changed to green for all images that view this link.
    Also displayed near the symbol are the measured range to the scene target and the standard deviation of this measurement.
Topology View (Database View)
    Lists of scans, scene targets, and scan-target links are presented in hierarchical tree format. The user can specify which groups to list, and can expand or collapse nodes in the tree for quick navigation throughout the database. This view shows existing scans or scene targets as well as the topological connections between scans and targets, i.e., which targets are seen in which scans, and vice versa. The lists may be sorted by name, location, or quality of measurement. Each entry displayed is a 'hot' entity: clicking the mouse on the object brings up a menu of actions available for the entity, and double-clicking executes a default action. See FIG. 3 for an example. Actions include printing properties (e.g., world location) or, in the case of scans, opening the scan image for visualization.
Navigator View
    The plot navigator view is a graphical representation of the geometry of the network. Optionally, a background image may be used. The image is typically a drawing of salient features in the scene, and provides geometric and physical context to the network being developed.
    The plot navigator view includes both scan and target locations. Spheres representing each scan in the network are located at each scan center. The color of the spheres is chosen to indicate various scan attributes, such as leveling state, correct network estimation, or groupings. Double-clicking on the sphere opens the Image View for the scan. Passing the mouse cursor over the sphere highlights the scan, which displays the scan's identification, or name, and the associated scene targets. Each target is rendered by a '+' sign at its world location with its id nearby. A solid line connecting the scan to the target represents the scan-target link. To reduce clutter, these three items are only displayed when highlighted.
    The plot navigator view also provides feedback as to the geometric strength, or confidence, between scans within the network. A 2D graph is shown, with each node in the graph located at a scan station. Solid lines are drawn connecting scans that have scene targets in common. The line is colored based on the number of common targets: red for one common target, yellow for two common targets, and green for three or more. The more targets in common, the stronger the geometry.
    Collectively, all this information allows the user to visually inspect the network quality and provides a valuable tool for debugging networks with errors or blunders.
Output Window and Popup windows
    Text reports and messages are sent to the output window, as well as any warnings produced throughout the process. The contents output window may be saved to a file.
    Any error message produced is sent to a pop-up message box, requiring the user to acknowledge the problem before continuing on.

Note that multiple Image Views may be active simultaneously but there is only one Navigator View, Topology View and Output Window per network under construction.

Field Procedure

A network assembly is produced in two phases. The initial phase consists of: evaluating the scene in question, determine the best locations for scans, then placing some or all targets in the scene. Scans must be taken to provide coverage of the scene as completely as required by the job specifications. Considerations include occlusion, desired angular resolution, desired range accuracy, stability of the scanner during the measurement, and suitability for placement of scene targets. At this point a general scanning pattern is decided upon, and a rough idea of the placement of scene targets is established. When deemed satisfactory, the scanning and network assembly process begins.

Figure 4:
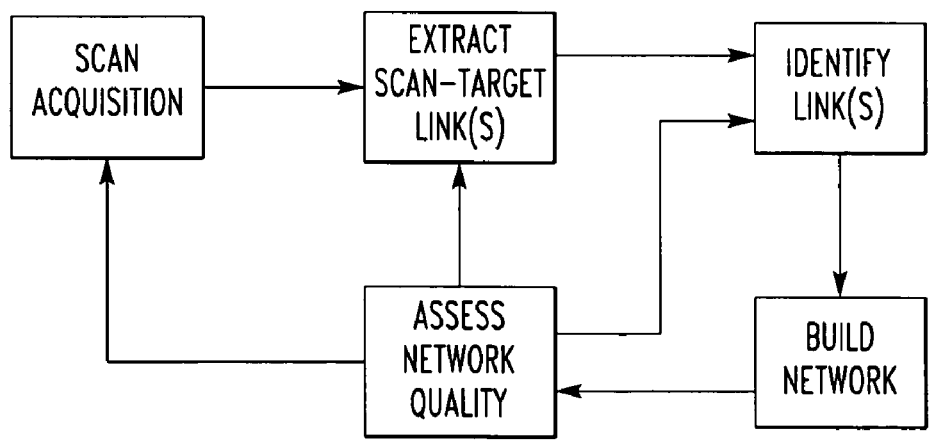
FIG. 4 is a process flow chart.

Once the initialization step is complete, subsequent fieldwork progresses iteratively, one scan at a time. FIG. 4 shows the sequence of tasks performed per iteration. The philosophy is to maintain the integrity of the network as much as possible. Prior to the acquisition of a new scan the network assembled up to this stage must pass all tests. If errors are present, they must be cleared before the next scan may be acquired. After the scan is taken, it must be successfully merged into the network assembly before additional scans can be taken.

In order, the steps are:

Target and Scan Placement

Scene targets are used to geometrically connect each scan's LCS with the WCS. They must be placed in the scene in such a way that they are visible from multiple scans, unless auxiliary surveys are used. Considerations for target placement include: visibility and proximity to the scanner, flatness & orientation, and permanence or adhesion. Also, targets too oblique with respect to the scanner are difficult to image and are avoided. In practice, a 45-degree limit works well: targets more oblique are not used for network assembly.

The scanner is moved to the desired location, and then leveled. There are four embodiments of leveling:

Manual: the operator adjusts the scanner so that two level vials read zero.

Approximate: the operator roughly adjusts the scanner to be close to level. Inclinometers measure the deviation from true level, which are recorded in the scan data file. All subsequent analysis applies a correction to account for the deviations.

Automatic: an automatic servomotor-inclinometer system adjusts the scanner.

None: the scanner is not leveled. These scans are not used to build the network, but rather are resectioned back into the network when the latter is complete.

After leveling is complete, a scan is begun. If desired, while the scan is taking place, the crew may choose to hang additional or remove scene targets, as appropriate.

Extraction of Scan-Target Links

This step refers to identifying areas of the reflectance image where scene targets are visible and determining the exact measurements to the target. Items 2 through 7 are determined for each link. Note that the identity of the scene target is not established in this step.

There are two embodiments of this step: manual or automatic. In the manual version, the operator selects a tool from the application menu then clicks the mouse on the image at a spot close to the target. The link is then extracted using the algorithm outlined in Appendix B. The algorithm is applied only to a section of the image surrounding the picked point.

In the automatic version, the algorithm is applied to the entire image as soon as the scan is complete, and all possible candidates for targets are highlighted in the Image View. In the case where the algorithm fails, perhaps due to an unfortunate similarity between something in the scene and the actual scene targets used, there must be a way to remove the candidate link. Simply deleting it is not desirable because doing so does not provide an accurate record of the field operator's actions, and there is no simple way to undo any erroneous deletions. Rather, the operator has the ability to mark links as 'dead'. Dead links are not used in the network analysis, and are listed separately in the Topology View. Dead links may be resurrected by using the naming tool explained below.

This automatic process is faster because the operator need not search through the entire image to find the links; they are already available. Finding the links manually can be time-consuming and error-prone because of the large size of the images, typically measuring at least 9000×1625 pixels. Given the pixel resolution of computer monitors and displays available today, it is not possible to see the entire image on the computer screen. One must either be zoomed out, in which case detail is lost and links may be overlooked, or be zoomed in, in which case panning through the image is required to search for links. In either case, it is difficult to be sure all links have been captured correctly.

Note that the automatic approach is the default. The manual approach is necessary only in cases where the automatic algorithm is too slow, for instance older hardware.

Identification of Scan-Target Links

Once the links are extracted, it remains to identify which scene targets correspond to each link. Multiple embodiments of this identification exist:

i. Manual/Rename

In the case where the operator initiates the extraction of the link, he or she is responsible for the identification as well. If the link is successfully extracted, a dialog pops up with which the name of the scene target may be entered. For speed, a drop-down dialog customized to a specific target-naming scheme is used. At this point the software checks to make sure that this link is not near any others, that is, the operator is prohibited from picking the same link twice and assigning it to different scene targets. As soon as link is identified the link, the Image View updates with the range and uncertainty information.

If the link-to-scan correspondence is incorrect, the operator can change it by clicking on the link in the Topology View and selecting the 'Rename' command. The drop-down dialog appears and is used as above. The software checks to make sure that the scene target has not already been linked with the scan, i.e., there cannot be two (or more) distinct links to the same scene target.

If no scene target exists in the database with the given id, one is created. In the case of rename, if the old scene target is not referenced anywhere else in the network, it is removed from the database.

ii. Auto-matching

Once a few links have been identified manually, it may be possible to identify others using geometric considerations. It may be possible with the links already identified to approximate the scan location within the existing network. If so, then the locations of the scene targets corresponding to each link already extracted but not identified are computed in the world coordinate system. If the world location of a known scene target is close to the link's computed location, then the system identifies the link with the scene target.

This process works best when automatic extraction of links is used, but does have applicability for manual extraction. Assume the scan location is known approximately. When the link is extracted, the 3D world coordinate of the corresponding scene target is computed, and compared to all existing scene targets. The link is identified with the scene target in proximity, if there is one.

If for some reason the auto-matching fails, either by missing a link or by indicating a false match, the user has the option to identify the link by hand or mark the false target as such, respectively. Automatic matching cannot, of course, identify links where the scene target appears for the first time. The steps are as follows:

Step 0: A working scan is acquired.

Step 1: The scan-target links are extracted as explained above.

Step 2: The operator selects one scan-target link in the working scan that corresponds to a world target already identified and introduced into the working database.

Step 3: Once this link is identified, the software automatically determines the location and orientation of the scan, relative to the world coordinate system, i.e., solve for the LCS->WCS transform. The details are provided by Appendix A.

Step 4: If no unidentified links remain, proceed to Step 8.

Step 5: In turn, each unidentified link is processed:
a. Step 5a: Apply the transform that was computed in Step 3 to the link's location in the LCS of the working scan. This computes the link's location in world coordinates (WCS.)
b. Search all known scene targets for the one closest to the world coordinates from Step 5a.
c. If the closest target is within about 6" of the link, then identify the link as connecting to the corresponding world target.

Step 6: If no identifications are made, proceed to Step 8.

Step 7: Go back to Step 3, but use all identified links to compute a better estimate of the scan's location and orientation.

Step 8: Report diagnostics to the operator. If the operator wishes to add or modify a link, return to Step 2.

iii. Optical recognition

If each scene target includes a unique identifying code juxtaposed with the black-and-white extraction pattern, it may be possible to use standard image processing techniques such as optical character recognition or barcode recognition to extract the identity completely automatically.

Build Network

A key time-saver and quality-assurance step is the automatic updating of the network geometry every time the topology changes. The problem of determining the geometry given the topology and the measurements between scans and targets is essentially the classical survey problem: stations consist of scans and scene targets connected through measurements, which are the scan-target links. A network must be built as soon as more than one scan has been acquired.

The work process enforced by the software makes sure that all scans except possibly for the working scan, together form a consistent, quality network. The working scan must be brought into the network assembly before another working scan can be acquired. When the working scan is made part of the network and a few links are established, it changes the topology, and typically provides for the enhanced network reliability by forming loops (constraints) in the topology. Therefore, it is advantageous to perform a bundle-adjustment to all the data simultaneously. Small corrections are made to each scan or scene target location (except for those scene targets marked 'Absolute') as well as to the LCS to WCS rotations.

This adjustment is done using standard survey techniques (Anderson, J. M., and E. M. Mikhail. Surveying: Theory and Practice, 7th ed. Boston: McGraw-Hill, 1998; STAR*NET, Least Squares Survey Adjustment Software Reference Manual. Oakland, Calif.: StarPlus Software Inc, 2000, both of which are incorporated by reference herein), and consists of two pieces: network estimation and bundle adjustment. Network estimation refers to putting together the network without using any redundant measurements. Bundle adjustment refers to adjusting the estimated network based to minimize the discrepancy ("residuals") between actual measurements and their expected values. In addition to improved quality of results, performing a bundle adjustment on the network provides a quality check on the network. The residuals can be analyzed statistically to establish a quantifiable confidence for the network. Though bundle adjustment is difficult, it is a solved problem and will not be discussed further.

Although additional information in the facings of the targets exists, it is not used for the adjustment since it is a derived quantity and therefore difficult to analyze statistically. Furthermore, the facings are not as reliable as the range or angular data since they are calculated by taking derivatives of noisy data. Once the network has been adjusted, however, the facings of all scene targets are adjusted using the following process:

For each scene target, links that correspond it are collected;

The facings for these links are converted to the WCS;

The average of all facings (in WCS) are computed and assigned to the scene target.

A quality-control step is taken whereby the facings for the links are all compared to the computed average by taking the dot product. Since the facings are unit vectors, the dot product is simply the cosine of the angle between the given vectors, so the error angle can be measured. If this angle is too great (larger than a few times the expected error in the facings), an error is reported to the operator.

Network Evaluation

The adjustment procedure above naturally produces a quantitative measure of statistical success in the chi-square parameter. The user is told whether or not the network adjustment passes at the 95% confidence level. The level is arbitrary and a different value may be chosen if necessary. Furthermore, for each measurement, the residual error is computed. This value is the arithmetic difference between what was measured and what would be expected for the adjusted solution if the measurements were perfect. Residuals are computed for range, azimuth, and zenith angle of the links. The user may view these residuals, sorted by magnitude. In addition, an error propagation analysis is performed on the data. Error ellipses for each scan location are computed. The values are sorted and provided to the user.

With the information available the user looks at the results and decides if there are any problems. In most cases if the chi-square test passes, the residuals are all less than about 3-sigma with no obvious patterns. These results are presented to the user in textual format, displayed in a scrollable output window.

A pattern of consistent residuals, for example target "A123" may have 2 or 3-sigma errors in range and azimuth when observed by many scans, might indicate that the target moved at some point during the network assembly. This scene target then would be marked as 'dead' and not used in further analysis. Note that identifying a scene target 'dead' is not the same as marking a single link as 'dead.'

The user never has the option to remove a scene target or a link. Rather they are given the ability to tag the target or link as 'dead.' This is a conscious strategy. In this manner an independent review of just the unreliable or dead targets can help assure quality without requiring a check of all scans, targets, or links.

At this stage the user has the following options for adjusting the network:

Mark a link as 'dead.' This is done if the target extraction algorithm accidentally identified something that is not a scene target.

Mark a scene target 'dead.' This is done to indicate that the scene target has been compromised in some way, and should not be used for analysis.

Rename a link. This is necessary if the user made a blunder in typing in a name or if the automatic target identification system is mistaken.

Rename a scene target (given a new, unused name.) This does not affect topology or geometry of the network, and is purely for organizational purposes.

Manually pick a new link. This option is not available if automatic extraction is enabled.

To make these changes the operator may work in any of the Views, including Image Views for scans other than the working scan. Once all tests pass and the operator has confidence the network assembly is correct, the next scan is acquired and processed.

Adding Ancillary Survey

In certain cases, it is necessary to add traditional survey information to the network produced by the laser scanner. This could happen, for instance, if the scene is too distant to see the benchmarks that define the world coordinate system. In this case a total station is brought in to connect a few scene targets visible in the scans to the global benchmarks.

Another case would be to provide a redundancy on the scanner network. It has been found that traditional surveys produce more blunders than laser scanning, but total stations, etc. may produce more precise measurements. Therefore, rather than produce two networks and compare them, it is better to use the measurement information obtained by both devices to build a single network and to rely on the statistical analysis to produce a single confidence value. Examination of residual errors usually identifies blunders quickly.

The combination of laser-scan measurements with traditional survey measurements is quite simple, and is performed in the bundle-adjust step. For this purpose, there is no distinction between the measurements made from the scan stations and the measurements made from the survey instrument stations. In this regard the laser scanner and total station can be considered identical: both measure range, zenith angle, and azimuth angle to a scene target, relative to the station LCS. The only difference is the precision of the measurement, which is recorded when the link is extracted and is propagated through the bundle adjustment.

The steps to accomplish this integration are as follows. First, the survey measurements must be imported into the field operation software. This is most easily accomplished by downloading the data from the total station directly to a file on the field computer. This file is then parsed appropriately and the survey measurements are added directly to the project database. Once imported, the "Build Network" step is executed automatically. Blunders may be removed as outlined in step 8.

EXAMPLE

Assuming the operator has chosen acceptable scanner and target locations, the scanner is positioned at a chosen location and is leveled accordingly. There are four leveling embodiments for the scanner. The first embodiment requires the field crew to level the scanner manually, using level vials attached to the scanner. The second entails positioning the scanner vertically, leaving it unleveled. Vertical scans are not estimated into the network. The third embodiment involves the scanner including a self-leveling system. A scanner operator positions the camera and instructs it to self-level, allowing the scanner hardware to determine when it's correctly leveled. In fourth embodiment inclinometers inside the scanner determine the degree of pitch and roll. These numbers are recorded within the scan file itself.

Figure 5:
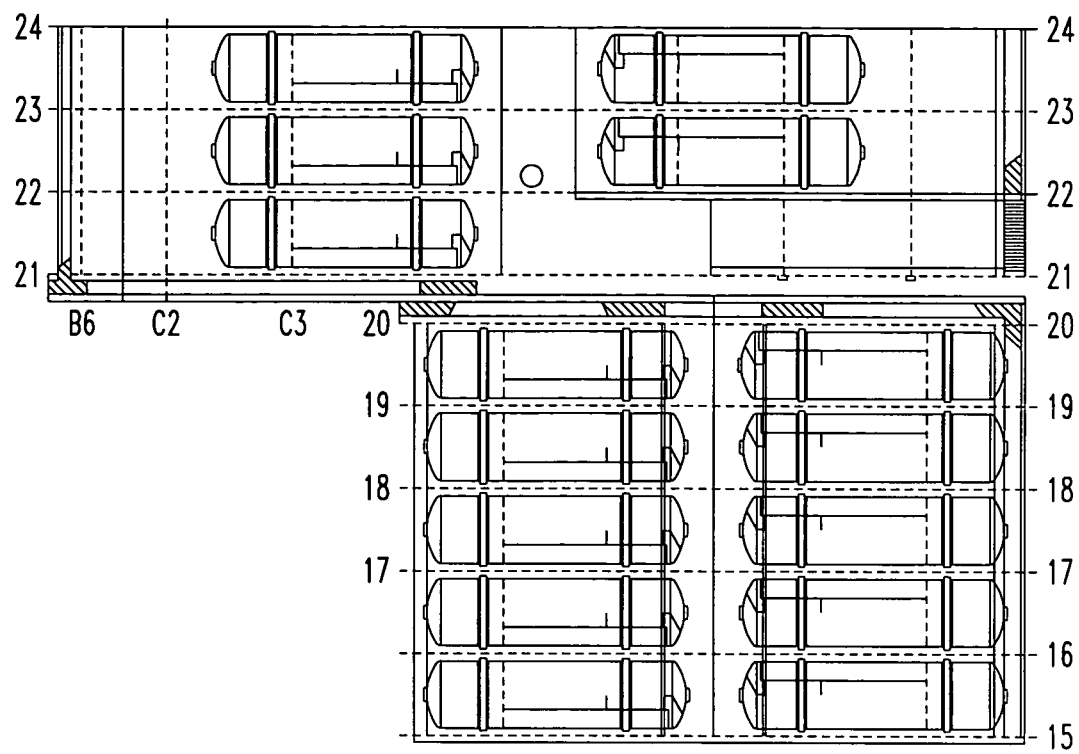
FIG. 5 is a navigator view with a single scan.

After the scanner is leveled the operator instructs the scanner to begin data acquisition using Quantapoint software. After the data acquisition has completed, the data is transferred to the operator's computer. The resulting scan is added to a plot navigator group. The plot navigator group displays all of the scans acquired by the operator for a given project, overlaid upon an image or drawing depicting an overhead view of the area. FIG. 5 depicts a plot navigator group with one scan included. The operator is also presented with an intensity image of the scan that can be viewed within the Quantapoint software. Note that the background image is optional. FIG. 2 represents a portion of an intensity image centered about two scene targets labeled "G021" and "G022".

The operator's next task is link extraction. As noted before, there are two embodiments: manual and automatic. To simplify this example it will be assumed that the automatic method is used. This method is used in cases where computing hardware is fast enough to process the image completely within a few seconds. Thus, after the scan is complete, the automatic algorithm searches the entire scan data for possible links.

Each extracted link must be identified with a scene target, so the next step is link identification using the intensity image obtained from above and tools from the Quantapoint software. As discussed earlier, there are three methods for identification. In the first, the user manually identifies all links. In the second, the software guesses the identity of unidentified links as soon as the working scan can be tied to the network. In the third, links are automatically identified using optical recognition.

In the manual method, first the cursor is moved to where the link appears in the image. This can be done using a mouse, a touchpad, the keyboard, or other device. Then the "target tool" command is activated, either by keypress, sequence of keystrokes, or mouse click. The software determines the link closest to the cursor and then prompts the user to identify the link using a pop-up dialog. If no link can be found, an error is reported. The operator must manually start the process for each link seen.

In the second method, as soon as there are sufficient links to register the working scan to the network, the software automatically processes the unidentified links and attempts to identify them according to the algorithm given in Appendix A.

In the third, automatic, method, image-processing techniques are used to read the textual or barcode information attached to the target. This situation is the ideal, but presents some difficulty in practice, especially when targets are located distant from the scanner.

Figure 6:
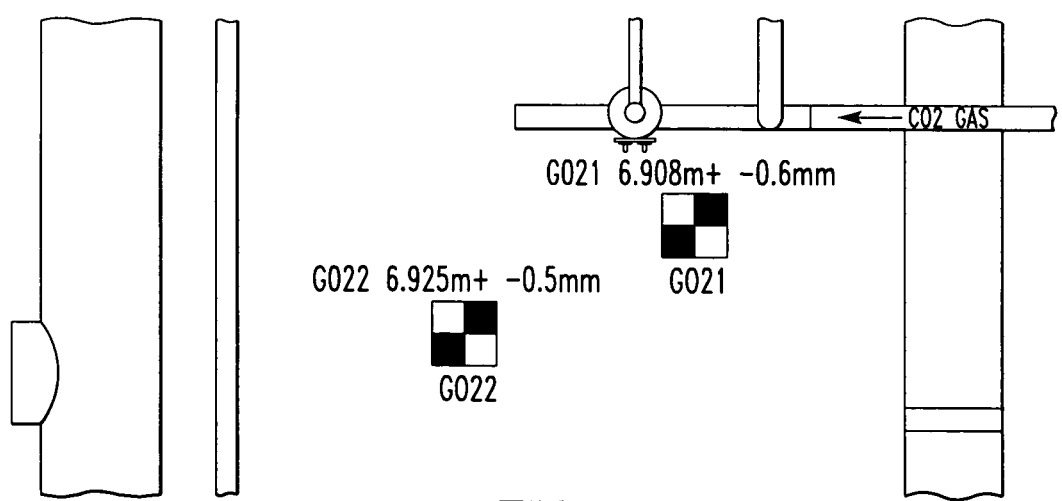
FIG. 6 is a portion of intensity image showing two extracted links.

Extracted and identified links are uniquely named and marked within the Image View for the working scan as seen in FIG. 6. Note the range and standard deviation information shown for each. In cases where many links exist in proximity, having the text for one extend overtop the others can be confusing. The software can be configured to select how the link information is displayed: The following choices are available:

No text whatsoever;
Only display the target id;
Display all information;
Display the target id always and the additional information when the mouse is near the link.

Figure 7:
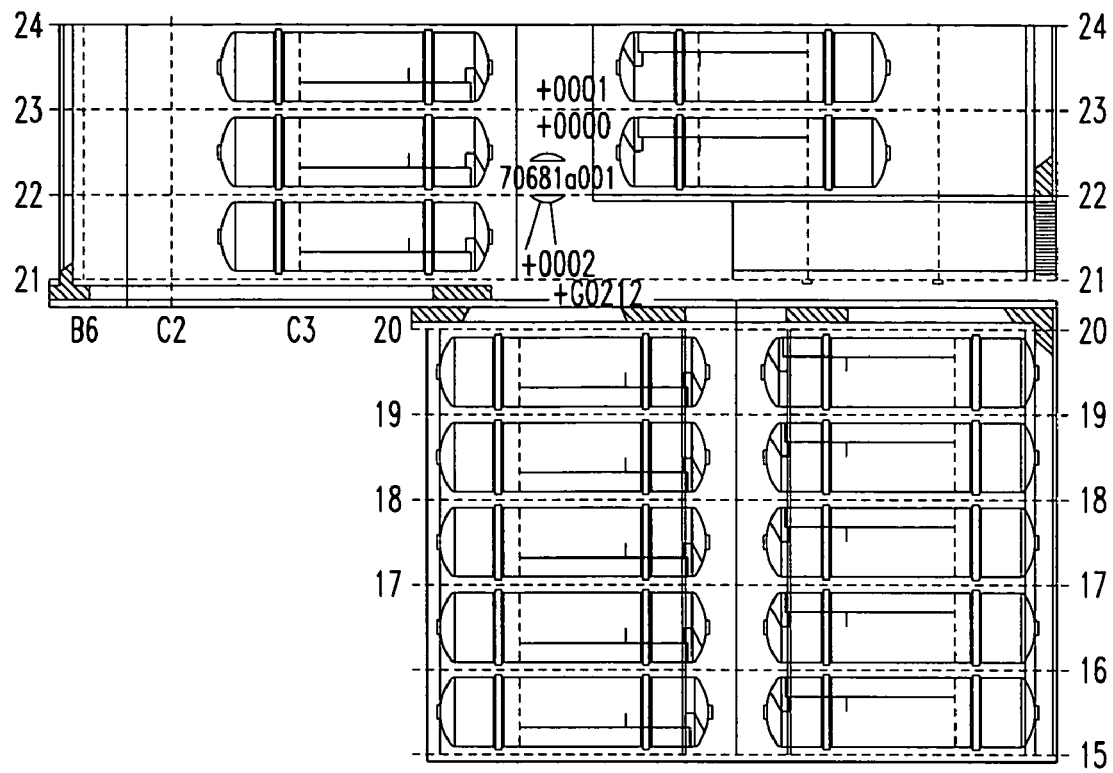
FIG. 7 is a plot navigator view showing a highlighted scan with links and targets.

Once a link has been extracted, highlighting a scan within the plot navigator group will show the target locations with respect to the scan. FIG. 7 demonstrates the initial geometry of the scan and extracted links. The lines connecting the scan with targets represent the scan-target links.

With the initial scan complete, the operator determines an acceptable location for the next scan according to scene targets already registered into the network. Of the targets visible to the new scan, at least 2 [leveled scan] or 3 [unleveled scan] must form part of the registered network already; it is impossible to register the new scan into the network with insufficient constraints. Subsequent scans are acquired in the same fashion as above. Target links within the new scan are then extracted so it can be estimated into the network.

After the link extraction is complete, the software computes the network geometry and registration to the world coordinate system, as described earlier. Errors are reported in a text window, and include unacceptable statistical confidence (failed $\chi 2$) or large residuals from the bundle adjustment, and overlapping targets. Scene targets are considered to "overlap" when the software computes two targets to be in spatial proximity. Since it is physically impossible for two distinct targets to be within a few centimeters of each other and still be valid, the only explanation is that the identity of one or both of the targets is wrong.

Figure 8:
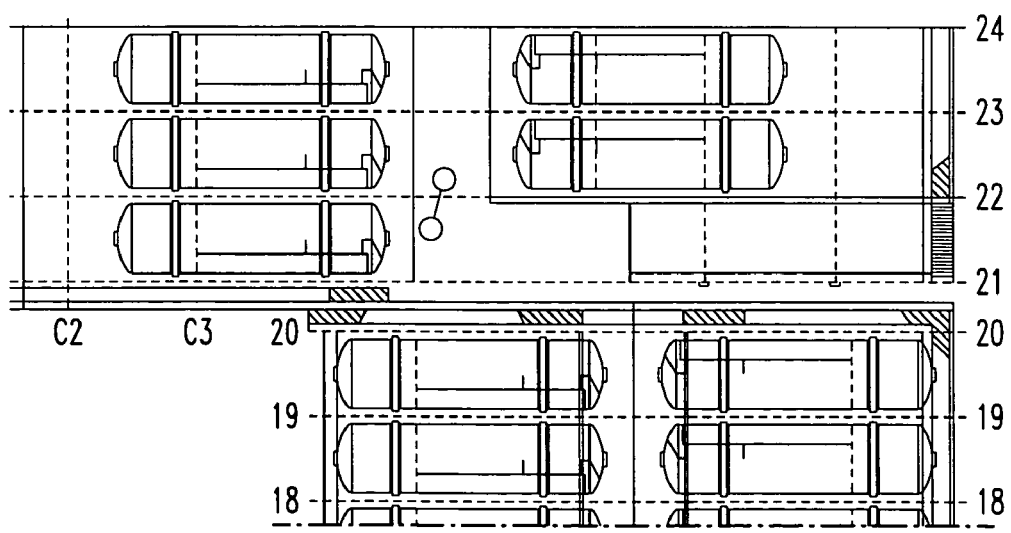
FIG. 8 is a plot navigator view consisting of a network of two interlinked scans.

The estimated network is displayed in the plot Navigator View. A color-coded confidence level is set according to the number of common scene targets associated with linked scans, as seen in FIG. 8. For each pair of scans, a count is made of the scene targets common to both. If zero or one, no line is drawn. For two, a red line is drawn, indicating weak confidence. For three, a yellow line indicates medium confidence. Four or more earn a green line, indicating a high level of confidence in the target identification. Most problems are the result of incorrectly identified links, so the first place to look when errors are reported is in the scans with red connections.

Figure 9:
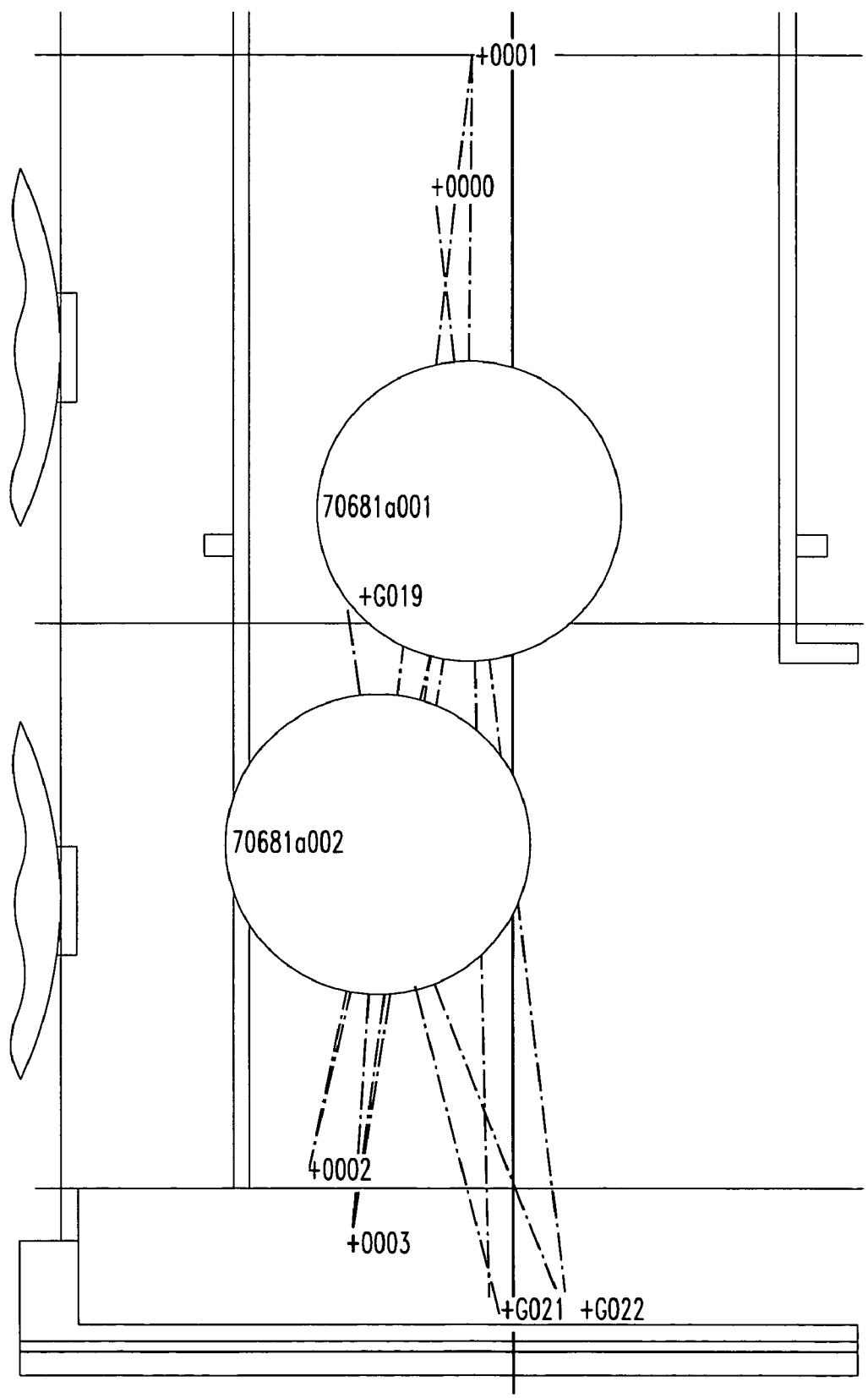
FIG. 9 is a navigator view close-up showing common targets between two scans.
Figure 10:
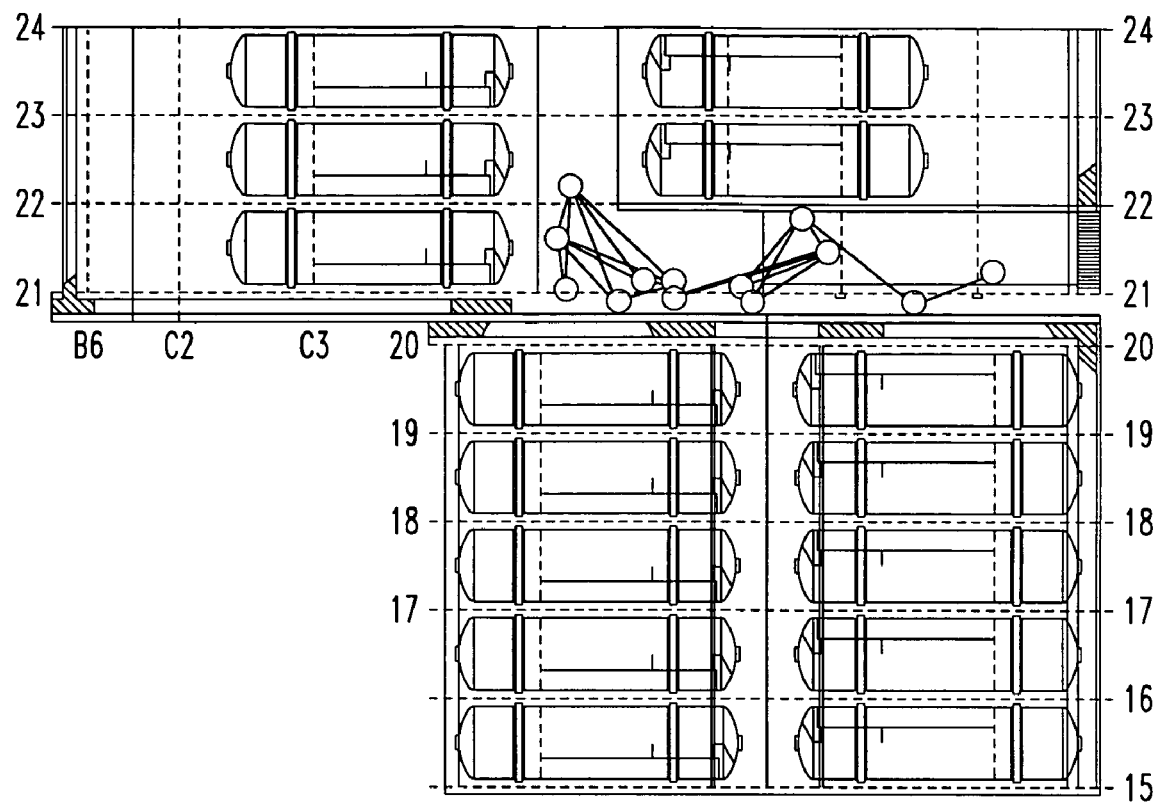
FIG. 10 is a navigator view of the complete network for a given region.

FIG. 9 depicts the two scans highlighted within the plot navigator group, displaying a graphical representation of the common targets. A hierarchical representation of the target and scan relationships can also be obtained through the Topology View provided within the operating software as seen in FIG. 10. The left column shows the relationships sorted by scene targets, with each target listing all the scans that it has been identified in. The right column is sorted by scans and lists all of the scene targets linked with each scan.

All errors must be cleared before additional scans are added to the network. The above process is continued, adding one scan at a time until the desired region is completely registered, as FIG. 3 demonstrates.

APPENDICES

A. Auto-Identification of Links

The goal is to automate as much as possible the network assembly process while not introducing any errors. If at least one link has been identified that connects the scan with an existing scene target, it may be possible to guess the identities of the other links.

The key is to produce a preliminary estimate of the transformation from the scan's LCS to the WCS. In general, this transformation consists of a 3D rotation coupled with a 3D translation. Assuming that the scanner has been leveled or the degree of tilt has been measured and compensated for, the 3D rotation portion is reduced to simply a single 1D rotation about the 'up' direction. Using standard notation for the homogeneous vector $p=<x, y, z, w>^T$, one can write the matrix equation $$\begin{bmatrix} X' \\ Y' \\ Z' \\ W' \end{bmatrix} = \begin{bmatrix} \cos\beta & -\sin\beta & 0 & t_x \\ \sin\beta & \cos\beta & 0 & t_y \\ 0 & 0 & 1 & t_z \\ 0 & 0 & 0 & 1 \end{bmatrix} \begin{bmatrix} x \\ y \\ z \\ w \end{bmatrix}. \quad (1)$$

This equation applies to both coordinates (where w=1) as well as direction vectors (where w=0). For scene targets, the $<x, y, z, w>^T$ vector could be either the measured location of the target in the scanner LCS or the measured normal vector. The primed vector is then the true world location or normal of the scene target. There are two ways to solve equation (1), depending on the number of links that have been identified with existing scene targets.

In the case of a single link, this process is unique to the laser-scanning environment and relies on the surface normal generated for the link. Since the facing (or surface normal) vectors are computed, both these vectors must be equal to within an error tolerance once the transform from LCS to WCS is taken into account. Since the facings are direction vectors, Equation (1) can be easily solved for the rotation angle R. The same logic can be applied to the location coordinate-vectors (w=1.) With the rotation angle R already known, equation (1) easily yields the translation portion of the transformation $$\vec{t} = [t_x, t_y, t_z]^T.$$

Note that the z-components of the two direction vectors should be reasonably close; if not, an error is reported.

If more than one link is available, a more robust solution to Equation (1) is available which does not require surface normals. For simplicity, ignore the z-component in this analysis.

Let
 X={$x_i$},
 P={$p_i$}, be two point clouds containing N corresponding points each, embedded in 2D Euclidean space. Set X contains the world locations of scene targets, and set P contains the LCS locations of the corresponding links. Denote the centroids of the two clouds as $\bar{x}$ and $\bar{p}$, respectively. The problem is to minimize the following function:

$$x^2 = \left(\frac{1}{2}\right) \sum_i (Rp_i + t - x_i)^2, \quad (2)$$

where $\vec{t}$ is the translation and the rotation is given by the standard matrix $$R = \begin{bmatrix} \cos\alpha & -\sin\alpha \\ \sin\alpha & \cos\alpha \end{bmatrix}, -\pi < \alpha \leq \pi.$$

Varying equation (2) with respect to the translation yields $\vec{t} = \bar{x} - R\bar{p}$. Substituting this value back into equation (2) produces $$x^2 = \left(\frac{1}{2}\right) \sum_i \left[R(\vec{p}_i - \bar{p})(\vec{x}_i - \bar{x})\right]^2, \quad (3)$$

Expanding the quadratic, it is seen that minimizing (C-2) is equivalent to maximizing $$\chi'^2 = \sum_i (\vec{x}_i - \bar{x})^T R(\vec{p}_i - \bar{p}) = Tr \sum_i R(\vec{p}_i - \bar{p})(\vec{x}_i - \bar{x})^T, \quad (4)$$

since the other terms produced are constant and do not affect the solution. Construct the 2×2 matrix $$M \equiv \begin{bmatrix} A & B \\ C & D \end{bmatrix} \equiv \sum_i (\vec{p}_i - \bar{p})(\vec{x}_i - \bar{x})^T / N.$$

In order to maximize $$Tr[RM] = Tr \begin{bmatrix} \cos\alpha & -\sin\alpha \\ \sin\alpha & \cos\alpha \end{bmatrix} \begin{bmatrix} A & B \\ C & D \end{bmatrix}$$
$$= (A+D)\cos\alpha + (B-C)\sin\alpha,$$

it suffices to choose $\alpha = a\tan 2(B-C, A+D)$, using the standard C-language function $a\tan 2(y, x)$. Note that a simple arctangent function cannot be used since the possible solution can range anywhere from 0 to 360 degrees.

If the point clouds contain a z-coordinate (as is the case here), the procedure is to work with the x and y coordinates as shown above and then to solve for the z-coordinate of the translation separately. In this case no rotation is present and it is easily shown that $\vec{t}_z = \bar{x}_z - R(\bar{p}_z)$.

In practice, once the solution $(R, \vec{t})$ is obtained, the actual value of equation (3) for the least-squares is computed. A result that is too large (say greater than a few cm per target) generally indicates a blunder, most likely an incorrectly identified link or else that a target has been moved. In this case an error is generated and reported to the operator.

Mathematics aside, the algorithm proceeds iteratively as follows, once a working scan is acquired and the scan-target links are extracted as explained in Section 6:

Step 1. The operator selects one scan-target link in the working scan that corresponds to a world target that has already been identified and introduced into the working database.

Step 2. Once this link is identified, the software automatically solves equation (2) as explained above to determine the location and orientation of the scan, relative to the world coordinate system.

Step 3. If no unidentified links remain, then go to Step 7.

Step 4: Subsequently, each unidentified link is processed, individually:

Step 4a: Apply the transform that was computed in Step 2 to the link's location relative to the LCS of the working scan. Doing so computes the link's location in world coordinates.

Step 4b: Search all known scene targets for the one closest to the link's world coordinates from step 4a.

Step 4c: If the closest target is within about 6" of the link, the normals (if computed) are within a few degrees of each other, and no other potential candidates are nearby, then identify the link as connecting to the corresponding world target. Note that the 6" threshold is arbitrary, but should be chosen close to the world target's physical size.

Step 5: If no identifications are made, go to Step 7.

Step 6: Return to Step 2, but use all identified links to compute a better estimate of the scan's location and orientation.

Step 7: Report diagnostics and errors to the operator. If the operator wished to add or modify a link manually, go back to Step 1.

The algorithm stops either when an error is encountered or when no additional unidentified links are identified. Note that this algorithm may be extended to work on unleveled scans in a straightforward manner, although the mathematics required to solve Equation (2) is much more involved (Horn, Berthold K. P., "Closed-form solution of absolute orientation using unit quaternions," J. Opt. Soc. Am. A, 4, 4. 629–642 (1987), incorporated by reference herein). In practice the number of unleveled scans is low and manual identification of scan-target links is suitable.

B. Link Extraction

Targets are extracted from the scanner data using both the reflectance and coordinate information obtained by the scanner. There are 7 steps in this process:

a) Determine candidates for links;
b) Locate the azimuth and elevation of the candidate target;
c) Quantify the distance and standard deviation in distance;
d) Compute the surface normal of the link;
e) Rejection of candidates;
f) Refine the azimuth, elevation, and distance measurements; and
g) Acceptance of link.

Targets are located in the scanner data using standard feature-identification techniques from image processing and computer vision. First, an appropriate mask is convolved with the image. Initially, the size of the mask is chosen to be such that it will identify targets at the maximum usable range. Peaks in the convolution larger than a threshold are considered candidates. The (I, J) location of the peak in the image determines the azimuth and elevation to the candidate target according to the calibration scheme for the scanner. Calibration will not be discussed here except to note that it essentially consists of a pair of functions that convert image coordinates to azimuth-elevation pairs, e.g. $\theta_S(I,J)$ and $\phi_S(I,J)$.

The subscript 'S' reinforces that the function depends on some scan parameters, such as angular resolution, etc.

The convolution can be done either over the entire scan or over a restricted sub-region. The former is done automatically, soon after the scan is complete. The latter is done after prompting by the operator and is only done if the automatic algorithm fails to identify a target. This special case most often happens if the target is partially occluded, so provision is also made for the operator to choose the mask size in this case.

The key to success in this step is the choice of the threshold value. A number too small will allow many false positives, but a number too large will reject legitimate targets. At this stage the criteria is to make sure that no legitimate targets are rejected. Subsequent steps will reject candidates that do not meet more stringent criteria.

Three ways are provided to set the threshold. First, an arbitrary number (given as a percentage) may be selected. The choice is then made empirically, based on experimentation or experience. This approach is not robust and may lead to problems when not understood properly. For imaging systems where external light is used to illuminate the targets (such as photogrammetry) this is the most usual choice.

Second, the threshold can be set based on a physical consideration of the illumination and reflectance. Since the laser scanner produces its own illumination, it is possible to compute the expected peaks of the correlation for all acceptable configurations; the choice for threshold is then the minimal value.

Note that this analysis actually specifies a range of possible values for the peak. In most cases the lower limit is the critical factor in determining whether or not the peak is chosen as a conditional target. However, there are situations in which a correlation peak is computed that is larger than the allowable value. Most often this occurs when specularly reflective objects in the scene are imaged. These objects can generate reflectance values grossly in excess of those expected from Malus' law and may create false positives. For this reason an upper threshold is also used to reject targets.

In the case where the operator has initiated the extraction process and the process fails, an error message is reported and no target is extracted.

Using this procedure the Quantapoint system is routinely able to extract the (I, J) coordinates of the target locations to better than one tenth of a pixel in accuracy. Also, a symmetric mask has been shown to perform well in cases where targets are not aligned perfectly to the scanner coordinate system.

The above process naturally produces a location in the scan image where the target has been found. The correlation is done pixel-by-pixel, so the computed peak occurs at a discrete coordinates, i.e., the peak is located to within one pixel of accuracy. More precision is desirable for survey work, so an interpolation of the correlation values at neighboring pixels is used. The sub-pixel location in the horizontal (I) coordinate, is determined by quadratic interpolation of the correlation at three pixels: the pixel to the left of the peak, the pixel at the peak, and the pixel to the right. If these values are A, B, C, respectively, then the sub-pixel offset is $$\Delta i = \frac{A-C}{2(A-2B+C)}.$$

An identical relation exists for the vertical offset, using correlations from the peak pixel in conjunction with those from the pixels below and above. These formulas are for interpolation using a first-degree polynomial, but higher-degree polynomials may also be used. The sub-pixel location is then converted to zenith and azimuth angles.

The reflectance information is used to locate the azimuth and elevation of the target, and the range data is used to determine the distance to the target. The combined 3D coordinate information is used to determine the surface normal to the target, if appropriate.

Having computed the angles to the target, the next step is to measure the distance from the scanner origin to the target. The simplest way to do so is to choose the range for a single pixel. The pixel could be the one nearest the target's location in the scan, for instance. The excessive range noise for a single measurement makes this approach undesirable in practice. Furthermore, there is no way to quantify the uncertainty in the measurement. Conceptually, the more robust approach is to compute the distance as an average of a large number of range measurements. Several points are needed in order to reduce and quantify the statistical inaccuracy of the range value. As many points as possible should be used, subject to the condition that they lie on the white portion of the target. Points from the black region are subject to extra noise that degrades the computation. The following advantages are realized: more accurate measurements, quantifiable uncertainty in the distance measurement. Furthermore, the surface normal is computed as a by-product of this calculation.

The implementation in practice is as follows:

A preliminary range is chosen from one of the pixels in the vicinity of the (I, J) image center of the target. The one corresponding to the largest intensity is taken.

A square window about the peak pixel is chosen as large as possible so that all pixels inside the box will lie on the target. Due to varying range and angle of incidence, each scene target will appear in a scan image with a unique shape. In the best case, the target is viewed straight on, so the edge length L of the box is chosen as slightly smaller than the target's physical size divided by the scanner's pixel resolution, in radians. Since the worst-case situation occurs with a target at a 45° angle of incidence, this quotient is reduced by 0.707 to obtain the desired value of L.

Pixels inside this box are checked for sufficiently large brightness. Those dimmer than a quality threshold are discarded. The value for the threshold is determined by experimentation and measurements based on the physical characteristics of the scanner.

If fewer than about 16 pixels remain, the algorithm reports an error to the user and aborts.

A square of side length L delimits a plane in 3D, assuming that the target is placed on a flat or minimally undulating surface. The equation of the target plane may be written as $$r_{ij}\hat{a}(i,j)\cdot\hat{n}=D,$$

where $r_{ij}$ is the range to pixel (i, j), $\hat{n}$ and D are the surface normal and the distance to the plane, respectively, and $\hat{a}(i,j)$ is the unit normal vector in the direction of the center of pixel (i, j). This equation would hold true for each pixel within the box if there were no noise in the system. In the presence of noise, these equations (one per pixel) can be rewritten as $$\frac{1}{r_{ij}} \approx \hat{a}(i,\,j) \cdot \left(\frac{\hat{n}}{D}\right).$$

The solution for $\vec{n} \equiv \vec{n}/D$ follows using standard least-squares techniques. In this solution the left-hand number is a measured quantity. The uncertainty in these measurements can be quantified (it depends on the scanner) and propagated through to the computed planar parameters $\hat{n}$ and D. Once these values are known the range to the target is computed from the direction vector at the sub-pixel angles, viz.

$$r_0 = \frac{D}{\hat{n} \cdot \hat{a}(i_{Peak,} + \Delta i,\ j_{Peak} + \Delta j)}.$$

There are two possible choices for the unit normal, corresponding to the two possibilities for the sign of D. By convention the signs are chosen such that the normal points towards the scanner.

Candidate targets are rejected at this point if any of the following are true:

The correlation at the peak pixel is outside of the allowable bounds;

The $\chi^2$ from the least-squares fit is bad, indicating that the points do not lie on a plane;

The uncertainty in the range is larger than acceptable (typically 1 mm);

The range itself is too close or too far from the scanner;

The normal indicates that the target is at too great an angle of incidence.

Once the normal is computed, it is possible to make a better estimate of the apparent size of the target in the image, since this size is proportional to the cosine of the obliqueness angle. Furthermore, a tighter bound for accepting the correlation can also be computed because the reflectance will be proportional to the square of the cosine, as given by the Law of Malus. With these better constraints, steps (a) through (e) are repeated. If the candidate passes all tests and the new link values do not differ appreciably from the originals, the link is accepted.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for registering multiple laser scan measurements of a scene to a reference coordinate system comprising:
    a laser scanner for scanning the scene and obtaining data of the scene;
    a plurality of targets placed in the scene; and
    means for forming a registration network using only the laser scanner data.

2. An apparatus as described in claim 1 wherein the forming means automatically identifies the targets in the scene.

3. An apparatus as described in claim 2 wherein the identifying means extracts the targets from the data.

4. An apparatus as described in claim 3 wherein the identifying means identifies the targets from the data.

5. An apparatus as described in claim 4 wherein the identifying means extracts all targets at a same first time from the data.

6. An apparatus as described in claim 5 wherein the identifying means identifies all targets at a same second time from the data.

7. An apparatus as described in claim 1 including means for forming an image of the scene from the registration network.

8. An apparatus as described in claim 6 wherein a coordinate location of a target is computed using both range and reflectance data.

9. An apparatus as described in claim 8 wherein the targets are two dimensional.

10. An apparatus as described in claim 1 including means for determining an attribute of an element in the scene.

11. A method for creating a registration network of the scene comprising the steps of:
    placing a plurality of targets in the scene;
    scanning the scene to obtain data of the scene with a laser scanner;
    identifying the targets in the scene; and
    forming the registration network using the laser scanner data only.

12. A method as described in claim 11 wherein the identifying step includes the step of automatically identifying the targets.

13. A method as described in claim 12 wherein the identifying step includes the step of extracting the targets from the data with the computer.

14. A method as described in claim 13 wherein the identifying step includes the step of identifying the targets from the data with the computer.

15. A method as described in claim 14 wherein the extracting step includes the step of extracting all the targets at a same first time from the data with the computer.

16. A method as described in claim 15 wherein the identifying step includes the step of identifying all the targets at a same second time from the data with the computer.

17. A method as described in claim 16 including the step of forming an image of the scene from the registration network.

18. A method as described in claim 17 including the step of determining an attribute of an element in the scene.

19. A method for creating a registration network of a scene comprising the steps of:
    scanning the scene and then taking data of the scene with a laser scanner; and
    forming the registration network and a survey of the scene from the data only from the scanner.

20. An apparatus for creating a registration network of a scene comprising:
    a laser scanner for scanning the scene and obtaining data of the scene;
    a plurality of targets placed in the scene; and
    means for automatically identifying the targets in the scene in real time for each scan by the scanner and connecting coordinate frames corresponding to each scan together to form the registration network.

21. A method for creating a registration network of the scene comprising the steps of:
   placing a plurality of targets in the scene;
   scanning the scene to obtain data of the scene with a laser scanner a plurality of times; and
   identifying automatically the targets in the scene in real time for each scan by the scanner and connecting coordinate frames corresponding to each scan together to form the registration network with a computer.

22. An apparatus for registering multiple laser scan measurements of a scene to a reference coordinate system comprising:
   a laser scanner for scanning the scene and obtaining data of the scene; and
   means for using both range and reflectance data to extract targets for each scan by the scanner and connecting coordinate frames corresponding to each scan together to form a registration network.

23. An apparatus as described in claim 22 wherein the using means quantifies automatically uncertainty in range and angular positioning measurements.

24. A method for creating a registration network of a scene comprising the steps of:
   scanning the scene to obtain data of the scene with a laser scanner; and
   using both range and reflectance data to identify links between scans and scene targets to form the registration network.

25. A method as described in claim 24 comprising the steps of:
   computing an orientation for each target in the scene; and
   using the orientation of each target for consistency checks and quality control.

* * * * *